June 14, 1938.   H. H. BIXLER   2,120,852
VALVE ASSEMBLY
Original Filed June 11, 1935
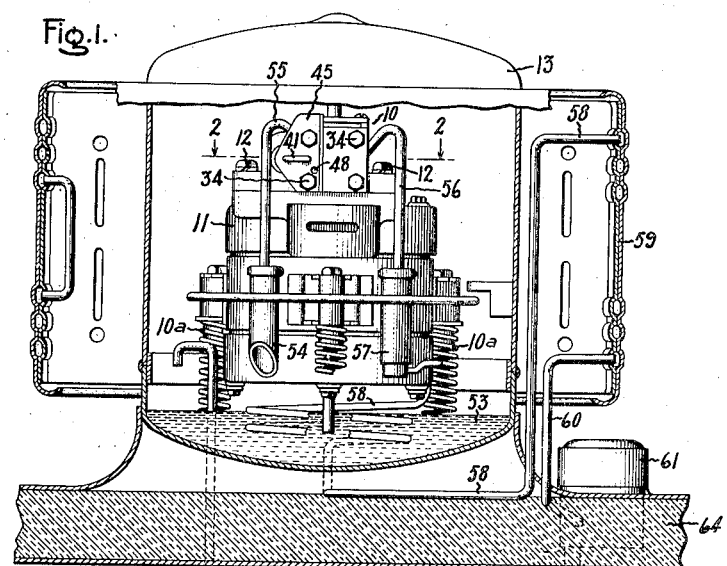
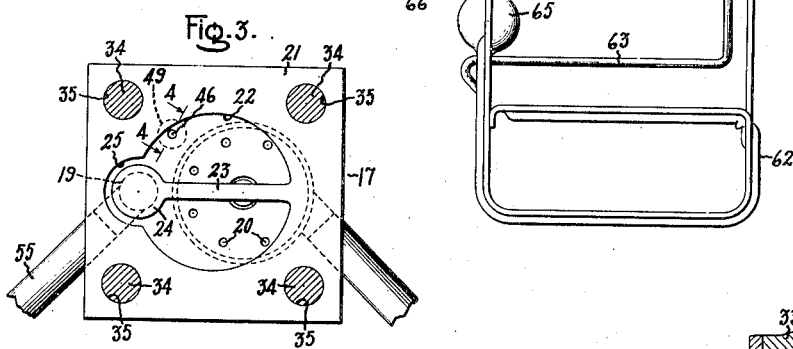
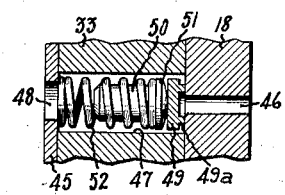
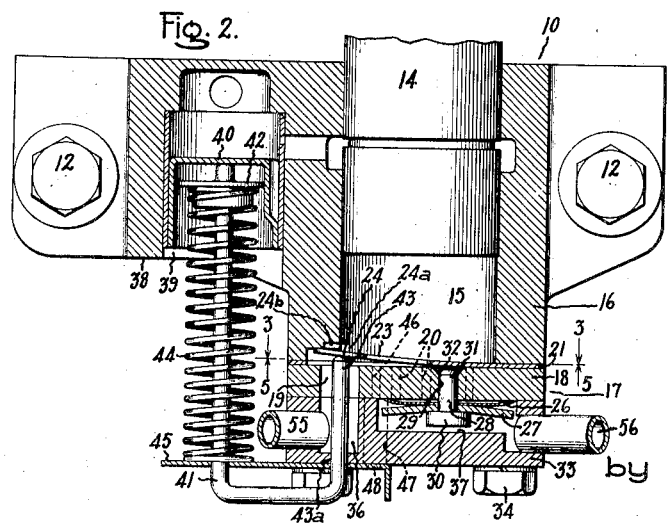
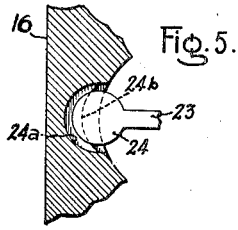
Inventor:
Harley H. Bixler:
by Harry E. Dunham
His Attorney.

Patented June 14, 1938

2,120,852

UNITED STATES PATENT OFFICE 2,120,852

VALVE ASSEMBLY

Harley H. Bixler, Schenectady, N. Y., assignor to General Electric Company, a corporation of New York Application June 11, 1935, Serial No. 26,067
Renewed November 6, 1936

1 Claim. (Cl. 251—119)

My invention relates to valve assemblies for compressors, or the like.

It is an object of my invention to provide a valve assembly for a compressor, or the like, which requires a minimum number of parts, which may be easily and economically manufactured and which is quiet and efficient in operation.

Further objects and advantages of my invention will become apparent as the following description proceeds, and the features of novelty which characterize my invention will be pointed out with particularity in the claim annexed to and forming a part of this specification.

For a better understanding of my invention, reference may be had to the accompanying drawing in which Fig. 1 is a side elevation, partly in section, of a refrigerating machine including a compressor provided with a valve assembly embodying my invention; Fig. 2 is a plan view, partly in section, on the line 2—2 of the compressor included in the refrigerating machine shown in Fig. 1; Fig. 3 is a sectional view, on the line 3—3 of the valve assembly included in the refrigerant compressor shown in Fig. 2; Fig. 4 is a fragmentary view on the line 4—4 of a relief valve included in the valve assembly shown in Fig. 3; and Fig. 5 is a detail sectional view on the line 5—5 of Fig. 2.

Referring to the drawing, in Fig. 1, I have shown a refrigerating machine including a compressor 10, which is secured as a unitary structure to the top of its vertical electric driving motor 11 by bolts 12. The compressor 10 and its driving motor 11 are mounted on springs 10a in an hermetically sealed casing 13. The compressor 10 is of the Scotch yoke type and includes a piston 14 which reciprocates in a longitudinal bore 15 formed in a cylinder 16. The lower open end of the bore 15, as viewed in Fig. 2, is closed by a valve assembly 17 embodying my invention.

The valve assembly 17 includes a flat rectangular valve plate 18 made of steel, or the like, and constituting a head for the cylinder bore 15. This valve plate is provided with a relatively large inlet passage 19 extending therethrough and a series of relatively small discharge passages 20 extending therethrough. The discharge passages 20 are preferably arranged about the arc of a circle, as shown in Fig. 3. A thin, flat, rectangular inlet valve supporting member 21 of spring steel, or the like, extends across the face of the valve plate 18, adjacent the cylinder 16. It will be noted that the end of the cylinder 16, the valve supporting member 21, and the valve plate 18, all have the same peripheral dimensions. The inlet valve supporting member 21 is provided with a centrally located circular aperture 22, which extends about the inner ends of the discharge passages 20, thus affording free communication between the cylinder and the discharge passages. A flexible integral inlet valve tongue 23 is formed in the valve supporting member 21 and extends diametrically across the circular aperture 22, between two of the discharge passages 20. The inlet valve tongue 23 is provided with an enlarged circular end 24, which extends into a notch 25 formed in the side of the circular aperture 22 adjacent the inlet passage 19. The surface of the valve plate 18 is ground, or otherwise machined, flat around the inner end of the inlet passage 19, thus forming a valve seat on which the enlarged end 24 of the inlet valve tongue 23 rests to close the inlet passage 19 during the operation of the compressor.

A recess 24a is formed in the wall of the cylinder 16 and surrounds the enlarged end 24 of the inlet valve tongue 23. A C-shaped projection 24b, formed in the base of the recess 24a, provides a stop against which the enlargement 24 rests when the valve is in its open position. The stop 24b is made C-shaped, as shown in Fig. 5, in order that a relatively large portion of the rear side of the enlargement 24 will be exposed to gaseous refrigerant in the cylinder bore 15. It is advantageous to provide such a stop for the inlet valve tongue 23 in order that it may be pushed firmly against the same, so that the inlet valve tongue will not vibrate when flexed backwardly. Also since the opening movement of the inlet valve tongue 23 is positively limited by the stop 24b, its movement in such direction under the pressure of an unloader actuating rod, hereinafter described, is limited, as is the length of travel of the unloader actuating rod itself.

The discharge passages 20 formed in the valve plate 18 are closed by a slightly concave disk-shaped exhaust valve element 26. The exhaust valve element 26 is provided with a slightly convex disk-shaped retainer 27. The exhaust valve element 26 and retainer 27 are secured to the valve plate 18 by a rivet 28, which passes through a hole 29 in the valve plate 18. It will be noted that the hole 29 is located at the center of the circle on the periphery of which the discharge passages 20 are located. The outer end of the rivet 28 is provided with an enlarged cylindrical head 30, and the inner end 31 thereof is peened over in a countersink 32 formed in the valve plate 18 at the inner end of the hole 29 therein.

The exhaust valve and retainer structure, described above, is not my invention, but is the invention of Christian Steenstrup, and is described and claimed in his Patent No. 2,095,842, granted October 12, 1937, and assigned to the General Electric Company, the assignee of my present invention.

The valve assembly 17 also includes a rectangular muffle box 33, secured to the outer face of the valve plate 18 by a series of machine screws 34. The screws 34 pass through registering holes in the muffle box 33 and in the valve plate 18; they also pass through registering holes 35 formed in the sheet of metal 21 adjacent the corners thereof. The inner ends of the screws 34 are secured in tapped holes formed in the cylinder 16. The screws 34 thus serve to secure the valve assembly 17, including the muffle box 33, the valve plate 18, and the inlet valve supporting member 21, on the open end of the head of the cylinder 16. The muffle box 33 is provided with an inlet recess 36 formed therein, one end of which registers with the inlet passage 19. The muffle box 33 is also provided with a discharge recess 37 formed therein, which communicates with the outer ends of the discharge passages 20.

The compressor 10 is provided with an unloader cylinder 38 which is formed as an integral part of the casting of the compressor cylinder 16. The unloader cylinder 38 has a longitudinal cylindrical bore 39 formed therein, parallel to the compression cylinder bore 15, in which an unloader piston 40 is arranged. A U-shaped operating rod 41 is secured at one end to a disk 42 rigidly mounted in the unloader piston 40 and the opposite end 43 of the operating rod 41 passes through a guiding bore 43a formed in the muffle box 33 and bears against the enlarged end 24 of the inlet valve tongue 23, thus opening the inlet passage 19. The operating rod 41 and unloader piston 40 are biased, to the position illustrated in Fig. 2, by a helical compression spring 44 mounted between the disk 42 and a retaining plate 45, which is secured to the muffle box 33 by two of the machine screws 34. By this arrangement the compressor is unloaded in starting, as the inlet valve 23 is held open until the compressor attains a predetermined per cent of its normal running speed. The compressor is loaded at that speed by oil pressure actuating the piston 40 to release the inlet valve.

The compressor unloader structure, described above, forms no part of my present invention, but is described and claimed in my Patent No. 2,102,403, granted December 14, 1937, and assigned to the General Electric Company, the assignee of my present invention.

As shown in Figs. 2 and 4, a relief valve passage 46 is provided in the valve plate 18 within the periphery of the circular opening 22 formed in the valve supporting member 21. The relief valve passage 46 communicates with a larger passage 47 formed in the muffle box 33, which in turn communicates with a hole 48 formed in the retaining plate 45, the hole 48 being somewhat smaller in diameter than the passage 47. The relief passage 46 is normally closed by a disk-shaped relief valve element 49 having a narrow annular seating portion 49a. The relief valve element 49 is resiliently retained in position across the end of the passage 46 by a helical compression spring 52 held under compression between the retaining plate 45 and a stud 50 bearing on the valve element 49. The stud 50 has an enlarged rounded end 51, bearing against the back of the valve element 49. The spring 52 is tightly fitted on the body portion of the stud 50, its inner end engaging the back of the enlarged end 51 of the stud. The spring 51 normally biases the valve 49 to the closed position illustrated in Fig. 4 and is made of such strength that when the pressure within the compressor cylinder 16 exceeds a predetermined value considerably above the normal discharge pressure the valve element 49 will be forced backward away from the end of the relief passage 46 and part of the compressed fluid contained in the cylinder 16 will pass therefrom through the passages 46 and 47 and the hole 48 into the interior of the casing 13 until the pressure within the cylinder 16 falls to a safe value. The pressure in the cylinder 16 may rise to the predetermined abnormal value referred to because of an obstruction in the condenser, failure of the discharge valve to open, or for some other similar reason. The compressor and condenser are thus protected from such abnormal pressures.

One side of the relief valve element is in direct communication with the interior of the casing 13, which contains low pressure gaseous refrigerant, and constitutes a zone of relatively low pressure. It is particularly advantageous in such case to arrange the opposite side of the relief valve element 49 in direct communication with the interior of the cylinder bore 15 as shown, rather than with the interior of the discharge recess 37, for example. This will be more readily understood from a consideration of the cycle of pressures to which the relief valve element 49 is subjected, when arranged as illustrated in the drawing. The compressor 10 of the refrigerating machine ordinarily operates only about 25% of the time, when subjected to normal load. During such period of operation, the pressure of the gaseous refrigerant compressed in the cylinder bore 15 exceeds the pressure of the gaseous refrigerant in the casing 13 by a substantial amount for only about half of each compression stroke. As a consequence, there is a pressure exerted on the inner face of the valve element 49 tending to unseat the same during only about one-sixteenth of the total elapsed time in which the machine is in use. The strain on the compression spring 52 is thus minimized and its life consequently increased. The high pressure in the cylinder bore 15 is applied to the relief valve element 49 in alternation with a low pressure in the cylinder bore 15 during the suction stroke of the piston 14 therein, so that the high pressure or unseating pressure is never continuously applied during the normal operation of the machine. This is advantageous since I have found that if high pressure gas, such as that contained in the discharge recess 37, is continuously applied to the inlet side of the valve element 49, the valve element may be gradually moved from its seat a slight distance, so that it in effect floats on a gas film and permits a continuous leakage of gas. On the other hand, when the valve element 49 is arranged as shown in the drawing, so that it is drawn against its seat on each suction stroke of the piston 14, the seating of the valve element is maintained in its proper condition and leakage is prevented. I prefer to employ a relatively narrow annular seating portion 49a on the valve element 49 to minimize sticking of the valve on its seat. Oxidized oil, rust or other foreign matter may collect on the seating portion of the valve element, but if the seating area is made small, such foreign matter will not prevent the proper opening of the valve element when the predetermined pressure conditions prevail.

In the operation of the refrigerating machine, shown in Fig. 1, when the electric driving motor 11 is started, lubricant is supplied under pressure by a pump (not shown) from the body of lubricant 53 contained in the lower portion of the hermetically sealed casing 13 to the bore 39 of the unloader cylinder 38. When the compressor reaches about 60 per cent full speed, the pressure of the accumulated lubricant within the unloader 38 moves the piston 40 and operating rod 41 outwardly against the bias of the spring 44, so that the end 43 of the operating rod 41 disengages the inlet valve tongue 23, and the latter is released for normal operation. Gaseous refrigerant contained in the hermetically sealed casing 13, enters an intake muffler 54, passes through a conduit 55 to the inlet recess 36 formed in the muffle box 33, and then to the inlet passage 19 formed in the valve plate 18. When the reciprocating piston 14 is retracted within the compression cylinder bore 15, the pressure therein is decreased and the resilient inlet valve tongue 23 is consequently flexed freely inwardly to a position displaced from the valve seat, under the pressure of the gas in the inlet passage 19, thus opening completely the inner end of the inlet passage and allowing the compression cylinder bore 15 to be filled with gaseous refrigerant. At the same time, the discharge valve element 26 is substantially flattened against the valve plate 18 by the pressure of the gas in the discharge recess 37 formed in the muffle box 33, thus closing the discharge passages 20. When the reciprocating cylinder moves downwardly, on the compression stroke, the pressure of gaseous refrigerant contained in the compression cylinder bore 15 rises and the resilient inlet valve tongue 23 is flexed back to its flat position, where it again closes the inlet passage 19, and the piston 14 then compresses the gas in the cylinder. When the pressure of the gaseous refrigerant compressed in the compression cylinder bore 15 reaches a predetermined value with respect to the pressure of the gaseous refrigerant in the discharge recess 37, the discharge valve element 26 is flexed outwardly against the retainer 27 by the differential in pressure thus created, opening the discharge passages 20. The compressed gaseous refrigerant then passes from the compression cylinder bore 15, through the discharge passages 20, to the discharge recess 37 formed in the muffle box 33, from which it passes through a conduit 56 to a discharge muffler 57. The compressed gaseous refrigerant flows from the discharge muffler 57 through a conduit 58, to the upper end of the natural draft air cooled condenser 59, where it is liquefied by the transfer of heat therefrom to the cooling air circulating over the surfaces of the condenser. The refrigerant liquefied in the condenser 59 flows therefrom through a conduit 60, passes through a flow controlling float valve 61, and is supplied through a liquid line 63 to a flooded type evaporator 62. The evaporator 62 is supported on the lower side of a removable top 64 of a refrigerator cabinet, or the like, provided with a cooling compartment in which the evaporator 62 is located. The liquid refrigerant contained in the evaporator 62 is vaporized by the absorption of heat from the compartment in which it is located and the vaporized refrigerant is collected above the level of the liquid refrigerant in a header 65 of the evaporator 62. The vaporized refrigerant collected in the header 65 then returns through a suction conduit 66, which is connected to the header 65, above the normal level of the liquid refrigerant therein, to the casing 13 above the level of lubricating oil therein and the cycle is continued.

While I have shown a particular embodiment of my invention in connection with a compression type refrigerating machine, I do not desire my invention to be limited to the particular construction shown and described, and I intend in the appended claim to cover all modifications within the spirit and scope of my invention.

What I claim as new and desire to secure by Letters Patent of the United States is,—

A valve assembly for a compressor, or the like, comprising a valve plate having an inlet passage and a discharge passage extending therethrough, said valve plate having a valve seat thereon extending about one end of said inlet passage, an inlet valve supporting member extending across one face of said valve plate and having a circular aperture therein extending about one end of said discharge passage and a notch in one side of said circular aperture arranged adjacent said inlet passage, an integral flexible inlet valve tongue formed on said inlet valve supporting member and extending across said aperture, and an enlarged end formed on said tongue and extending into said notch and cooperating with said valve seat for closing said inlet passage and flexing freely to a position displaced from said valve seat for opening completely said inlet passage.

HARLEY H. BIXLER.